United States Patent Office.

IMPROVED BURNING FLUID.

GEORGE L. FATTIE, OF BUFFALO, NEW YORK.

Letters Patent No. 59,797, dated November 20, 1866.

SPECIFICATION.

TO ALL WHOM IT MAY CONCERN:

Be it known that I, GEORGE L. FATTIE, of the city of Buffalo, county of Erie, and State of New York, have invented a new Illuminating Burning Fluid, and I do hereby declare that the following is a full and exact description of the manner of compounding or manufacturing the same:

Filtered or purified gasoline is the base of the compound.

To forty gallons of purified gasoline, add five pounds of pulverized brimstone, one hundred pounds of rusty iron, and one bushel of onions mashed fine, and five pounds of pulverized rosin. Put these ingredients, (in substantially the same proportions for a greater or less quantity,) into a suitable vat or tank, and let them remain in the tank twenty-four hours, (or thereabouts,) stirring them frequently during that time, and then draw off the fluid above the sediment. Add to this fluid about two pounds of pulverized amber, or its equivalent of oil of amber.

The product is an illuminating burning fluid of great brilliancy, applicable for family use in lamps of suitable construction. It is very cheap, and entirely safe. It possesses no explosive qualities.

The iron is not all exhausted in one operation, and hence by washing it, after it has been used, and allowing it again to rust, it may be used again and again.

What I claim as my invention, and desire to secure by Letters Patent, is—

An illuminating burning fluid compounded substantially as herein described.

GEO. L. FATTIE.

Witnesses:
   E. B. FORBUSH,
   B. H. MUEHLE.